United States Patent [19]
Dalle et al.

[11] Patent Number: 6,013,682
[45] Date of Patent: Jan. 11, 2000

[54] METHOD OF MAKING SILICONE IN WATER EMULSIONS

[75] Inventors: Frederic Dalle, Kraainem; Leon Marteaux, Brussels, both of Belgium

[73] Assignee: Dow Corning S. A., Seneffe, Belgium

[21] Appl. No.: 09/062,801

[22] Filed: Apr. 20, 1998

[30] Foreign Application Priority Data

Apr. 23, 1997 [GB] United Kingdom .................... 9708182

[51] Int. Cl.[7] ........................................ B01F 17/00
[52] U.S. Cl. ................... 516/55; 528/15; 528/31; 524/862
[58] Field of Search ................. 516/55; 528/15, 528/31; 524/862

[56] References Cited

U.S. PATENT DOCUMENTS

| | | | |
|---|---|---|---|
| 2,823,218 | 2/1958 | Speier | 556/415 |
| 3,419,593 | 12/1968 | Willing | 556/479 |
| 4,248,751 | 2/1981 | Willing | 524/588 |
| 5,026,769 | 6/1991 | Liles | 524/837 |
| 5,035,832 | 7/1991 | Takamura et al. | 510/405 |
| 5,087,443 | 2/1992 | Chizat et al. | 424/47 |

*Primary Examiner*—D. Gabrielle Brouillette
*Assistant Examiner*—Monique T. Cole
*Attorney, Agent, or Firm*—Jim L. DeCesare

[57] ABSTRACT

Described is a method of making a silicone in water emulsion. The method comprises mixing (I) a composition containing at least one polysiloxane, at least one organosilicon material that reacts with said polysiloxane by a chain extension reaction and a metal containing catalyst for said chain extension reaction, (II) at least one surfactant and (III) water to form a mixture. The mixture is emulsified to form an emulsion which can have a wide variety of silicone volume fractions, a broad range of mono-disperse particle sizes and a wide variety of molecular weight polymers.

5 Claims, No Drawings

METHOD OF MAKING SILICONE IN WATER EMULSIONS

BACKGROUND OF THE INVENTION

The present invention relates to a method of making silicone in water emulsions. Specifically, the present invention relates to a simple process of making silicone in water emulsions in which silicones polymerize by chain extension at the interior of a silicone droplet suspended in water.

Several techniques are known in the art for the production of silicone in water emulsions (hereinafter 's/w emulsions'). One technique, emulsion polymerization, is described, for example, in European Patent Applications 268,982, 459,500 and 698,633. This process involves emulsifying a low molecular weight silicone and an anionic or cationic surfactant in a high shear inducing device. The silicone is polymerized by the addition of a strong acid or base, often at elevated temperatures. This process can yield relatively high molecular weight silicone polymer (for example <900,000 mm$^2$/sec) in water emulsions.

Emulsion polymerization, however, has a number of drawbacks. For instance, polymerization in the emulsion polymerization process occurs at the silicone water interface. As such, the rate of polymerization is faster with smaller particles because of the larger surface area and, thus, it is impossible to produce large particle size, high molecular weight silicone gum in water emulsions. Similarly, emulsion polymerization involves a number of processing steps and/or materials which are disadvantageous. For instance, emulsion polymerization requires long batch times and caustic materials (strong acidic or basic catalysts which must be neutralized). Finally, the emulsions resulting from emulsion polymerization may have limited utilities because of the materials used in their manufacture. For instance, the anionic and cationic surfactants used in these emulsions can be irritating to the skin and they can affect the stability of products into which the emulsions are incorporated.

A second technique for the production of s/w emulsions is mechanical emulsion. In this process, a silicone polymer is mechanically emulsified with a variety of surfactants and water. This process allows for the production of anionic, cationic, non-ionic or amphoteric emulsions having a variety of particle sizes and high silicone fractions. Similarly, the process is more advantageous than emulsion polymerization in that the processing time is relatively short and the process does not require heating or a neutralization step.

Mechanical emulsion, however, is limited by the shear stress which can be induced by the mixer. For instance, conventional mixers are often limited to silicone polymers with a viscosity of about 600,000 mm$^2$/sec at 25° C.

We have now discovered a more desirable method of making s/w emulsions and novel s/w emulsions having a wide range of physical characteristics.

SUMMARY OF THE INVENTION

The present invention provides in one of its aspects a method of making a silicone in water emulsion comprising mixing materials comprising (I) a composition containing at least one polysiloxane, at least one organosilicon material that reacts with said polysiloxane by a chain extension reaction and a metal containing catalyst for said chain extension reaction, (II) at least one surfactant and (III) water to form a mixture; and emulsifying the mixture.

The s/w emulsions produced by the process of this invention can have a wide variety of silicone volume fractions, particle sizes and molecular weights including novel materials having large volume fractions of the silicone and large particles containing high molecular weight silicone gums. Moreover, the process results in emulsions in which the particle size and the molecular weight of the silicone inside the droplets are independent parameters.

DETAILED DESCRIPTION OF THE INVENTION

According to the invention, a mixture is prepared by blending (I) a composition containing at least one polysiloxane, at least one organosilicon material that reacts with said polysiloxane by a chain extension reaction and a metal containing catalyst for said chain extension reaction, (II) at least one surfactant and (III) water.

The composition (I) containing at least one polysiloxane, at least one organosilicon material that reacts with said polysiloxane by a chain extension reaction and a metal containing catalyst for said chain extension reaction according to this invention is not critical and nearly any which cures by the chain extension reactions can be used herein. Such chain extension reactions generally involve (1) a polysiloxane which has an end group which reacts with the end group of another polysiloxane or (2) a polysiloxane having a reactive end group which is chain extended with a chain extension agent such as an silane. Alternatively, a small amount of the chain extension can occur at non-terminal sites on the polysiloxane.

Chain extension reactions with polysiloxanes (polysiloxanes are also called silicones or organopolysiloxanes) are known in the art and can involve, for instance, the hydrosilylation reaction in which an Si—H reacts with an aliphatically unsaturated group in the presence of a platinum or rhodium containing catalyst. Alternatively, the reaction can involve the reaction of an Si—OH (for example polymers) with an alkoxy group (e.g., alkoxysilanes, silicates or alkoxysiloxanes) in the presence of a metal containing catalyst. Still other reactions can involve the reaction of an Si—OH with a CH$_3$COOSi— in the presence of water, the reaction of an SiOH with R$_2$C=NOSi, or the reaction of SiOH with an SiH in the presence of a metal containing catalyst.

The polysiloxane(s) used in the above reactions generally comprises a substantially linear polymer of the structure:

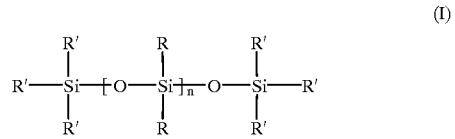

(I)

In this structure, each R and R' independently represent a hydrocarbon group having up to 20 carbon atoms such as an alkyl (for example methyl, ethyl, propyl or butyl), an aryl (e.g., phenyl), or the group required for the chain extension reaction described above ('reactive group', for example hydrogens, aliphatically unsaturated groups such as vinyl, allyl or hexenyl, hydroxys, alkoxys such as methoxy, ethoxy or propoxy, alkoxy-alkoxy, acetoxys, aminos), provided that on average there is between one and two reactive groups (inclusive) per polymer, and n is a positive integer greater than one. Preferably, a majority, more preferably >90%, and most preferably >98% of the reactive groups are end-groups, that is R'.

Preferably n is an integer that results in polysiloxanes with viscosities between about 1 and about 1×10$^6$ mm$^2$/sec at 25° C.

If desired, the polysiloxane (I) can have a small amount of branching (for example less than 2 mole % of the siloxane units) without affecting the invention, that is the polymers are 'substantially linear'. Moreover, if desired, the R and R' groups can be substituted with, for instance, nitrogen containing groups (for example amino groups), epoxy groups, sulphur containing groups, silicon containing groups, oxygen containing groups. Preferably, however, at least 80% of the R groups are alkyls and, more preferably, the alkyl groups are methyl groups.

The organosilicon material that reacts with the polysiloxane by a chain extension reaction can be either a second polysiloxane or a material that acts as a chain extension agent. If the organosilicon material is polysiloxane, it too will generally have the structure described above (I). In such a situation, however, one polysiloxane in the reaction will comprise one reactive group and the second polysiloxane will comprise a second reactive group which reacts with the first.

If the organosilicon material comprises a chain extension agent, it can be a material such as a silane, a siloxane (for example disiloxane or trisiloxane) or a silazane. For instance, a composition comprising a polysiloxane according to the above structure (I) which has at least one Si—OH group can be chain extended by using an alkoxysilane (for example a dialkoxysilane or trialkoxysilane) in the presence of a tin or titanium containing catalyst.

The metal containing catalysts used in the above chain extension reactions are often specific to the particular reaction. Such catalysts, however, are known in the art. Generally, they are materials containing metals such as platinum, rhodium, tin, titanium, copper, lead.

In a preferred embodiment of the invention, the polysiloxane has at least one aliphatically unsaturated group, preferably an end group, and the organosilicon material is a siloxane or a polysiloxane having at least one Si—H group, preferably an end group, in the presence of a hydrosilylation catalyst. The polysiloxane having at least one aliphatically unsaturated group has the structure (I) wherein R, R' and n are as defined above and provided that on average between one and two (inclusive) R or R' groups comprise an aliphatically unsaturated group per polymer. Representative aliphatically unsaturated groups include vinyl, allyl, hexenyl and cyclohexenyl or a group R"CH=CHR'", where R" represents a divalent aliphatic chain linked to the silicon atom and R'" represents a hydrogen atom or an alkyl group. The organosilicon material having at least one Si—H group preferably has the above structure (I) wherein R, R' and n are as defined above and provided that on average between one and two (inclusive) R or R' groups comprise hydrogen atoms and n is 0 or a positive integer. This material can be a polymer or a lower molecular weight material such as a siloxane (for example a disiloxane or a trisiloxane).

The polysiloxane having at least one aliphatically unsaturated group and the organosilicon material having at least one Si—H group react in the presence of a hydrosilylation catalyst. Such catalysts are known in the art and can include, for example, platinum and rhodium containing materials. These catalysts may take any of the known forms such as platinum or rhodium deposited on carriers such as silica gel or powdered charcoal, or other appropriate compounds such as platinic chloride, salts of platinum and chloroplatinic acids. A preferred material is chloroplatinic acid either as the commonly obtainable hexahydrate or the anhydrous form because of its easy dispersibility in organosilicon systems and its non-effect on colour of the mixture. Platinum or rhodium complexes may also be used for example those prepared from chloroplatinic acid hexahydrate and divinyltetramethyldisiloxane. Generally, these catalysts are used in amounts of between about 0.0001 and 10 wt. % based on the weight of the composition (I).

In a second preferred embodiment of the invention, the polysiloxane has at least one Si—OH group, preferably an end group, and the organosilicon material has at least one alkoxy group, preferably a siloxane having at least one Si—OR group, or an alkoxysilane having at least two alkoxy groups in the presence of a metal containing catalyst. In this case, the polysiloxane having at least one SiOH group has the structure (I) wherein R, R' and n are as defined above and on average between one and two (inclusive) R or R' groups comprise a hydroxyl group (OH). The organosilicon material having at least one alkoxy group can have the structure (I) wherein R, R' and n are as defined above and on average between one and two (inclusive) R or R' groups comprise alkoxy groups, for examples of the structure (OR) in which R is as defined above and n is 0 or a positive integer. Alternatively, the organosilicon material can be a silane of the structure $R_m Si(OR)_{4-m}$ wherein R is as defined above and m is 0 to 2. Other materials containing the alkoxy group (for examples alkoxy-alkoxys) may also be used herein.

A variety of metal catalysts for the reaction of an Si—OH with an Si—OR are known in the art and may be employed including, for example, organic metal compounds such as organotin salts, titanates, or titanium chelates or complexes. Examples of catalysts include stannous octoate, dibutyltin dilaurate, dibutyltin diacetate, dimethyltin dineodecanoate, dibutyltin dimethoxide, isobutyl tin triceroate, dimethyltin dibutyrate, dimethyltin dineodecanoate, triethyltin tartrate, tin oleate, tin naphthenate, tin butyrate, tin acetate, tin benzoate, tin sebacate, tin succinate, tetrabutyl titanate, tetraisopropyl titante, tetraphenyl titante, tetraoctadecyl titanate, titanium naphthanate, ethyltriethanolamine titante, titanium diiso-propyl diethyl acetoacetate, titanium diisopropoxy diacetyl acetonate, and titanium tetra alkoxides where the alkoxide is butoxy or propoxy. Generally, these catalysts are used in amounts of between about 0.001 and 10 wt. % based on the weight of the composition (I).

Although a limited number of compounds are exemplified, any composition containing at least one polysiloxane, at least one organosilicon material that reacts with said polysiloxane by a chain extension reaction and a metal containing catalyst for said chain extension reaction can be used herein.

The mixture used to form the emulsion also contains at least one surfactant (II). This can be a non-ionic surfactant, a cationic surfactant, an anionic surfactant, alkylpolysaccharides, amphoteric surfactants.

Examples of non-ionic surfactants include polyoxyalkylene alkyl ethers, polyoxyalkeylene sorbitan alkyl esters, polyoxyalkylene alkyl esters, and polyoxyalkylene alkylphenol ethers, polyethylene glycols, polypropylene glycols, and diethylene glycols.

Examples of cationic surfactants include quaternary ammonium hydroxides such as tetramethylammonium hydroxide, octyltrimethylammonium hydroxide, dodecyltrimethyl ammonium hydroxide, hexadecyltrimethyl ammonium hydroxide, octyldimethylbenzylammonium hydroxide, decyldimethylbenzyl ammonium hydroxide, didodecyldimethyl ammonium hydroxide, dioctadecyl dimethylammonium hydroxide, tallow trimethylammonium hydroxide and cocotrimethylammonium hydroxide as well as corresponding salts of these materials, fatty acid amines and amides and their derivatives and the salts of the fatty acid amines and amides including aliphatic fatty amines and their derivatives, homologs of aromatic amines having fatty chains, fatty amides derived from aliphatic diamines, fatty amides derived from disubstituted amines, derivatives of ethylene diamine, amide derivatives of amino alcohols, amine salts of long chain fatty acids, quaternary ammonium bases derived from fatty amides of disubstituted diamines quaternary ammonium bases of benzimidazolines, basic compounds of pyridinium and its derivatives, sulfonium compounds, quaternary ammonium compounds of betaine, urethanes of ethylene diamine, polyethylene diamines and polypropanolpolyethanol amines.

Examples of suitable anionic surfactants include alkyl sulfates such as lauryl sulfate, polymers such as acrylates/ C10–30 alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulfate esters of monoalkyl polyoxyethylene ethers; alkylnapthylsulfonic acid; alkali metal sulforecinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulfates, ester sulfates, and alkarylsulfonates.

Examples of suitable alkylpolysaccharides include, for example, materials of the structure $R^1$—O—$(R^2O)_m$-$(G)_n$ wherein $R^1$ represents a linear or branched alkyl group, a linear or branched alkenyl group or an alkylphenyl group, $R^2$ represent an alkylene group, G represents a reduced sugar, m denotes 0 or a positive integer and n represent a positive integer as described, for example, in U.S. Pat. No. 5,035,832.

Examples of suitable amphoteric surfactants include cocamidopropyl betaine and cocamidopropyl hydroxysulfate.

The above surfactants may be used individually or in combination.

The particle size of the silicone in the emulsion is dependent on, among other factors, the amount and type of surfactant employed. The amount of surfactant used will vary depending on the surfactant, but generally it is used in an amount of between about 1 and 30 wt. % based on the total weight of the composition (I).

The final material used to form the emulsions herein is the water which forms the continuous phase of the emulsion and into which the silicone oil droplets are dispersed.

If desired, other materials can be added to either phase of the emulsions. For example, materials which assist in the chain extension reaction (for example other chain extenders), conventional inhibitors, perfumes, colorants, thickeners, preservatives, plasticizers, active ingredients (for example pharmaceuticals) may be used herein.

According to the invention, composition (I), surfactant (II) and water (III) are mixed by simple agitation to form a coarse water in oil mixture. This mixture is then emulsified. During emulsification, the coarse water in oil mixture is inverted into a fine silicone in water emulsion. The emulsification can be accomplished by conventional means such as a batch mixer, colloid mill or line mixer. The emulsification process is, thus, simple and fast.

The composition (I), surfactant (II) and water (III) can be mixed all at once or, alternatively, the materials can be mixed in any order. However, when the polysiloxane, the organosilicon material and the metal containing catalyst of composition (I) are combined, the polymerisation reaction begins. As such, it may be preferred to mix one of the components of the composition (I) last. For example, it may be preferred to mix either the metal containing catalyst or either the polysiloxane or the organosilicon material to the mixture last.

We have discovered that anionic surfactants often increase the kinetics of the chain extension reaction between a polysiloxane having at least one aliphatically unsaturated group and an organosilicon material having at least one Si—H group in the presence of a hydrosilylation catalyst. As such, in a preferred embodiment of the invention wherein these reactants are used, it is often preferred to first mix the polysiloxane containing the unsaturated group and the metal containing catalyst (e.g., the platinum) and then mix in a mixture of the anionic surfactant and the organosilicon material (e.g., the Si—H material). Alternatively, a cure inhibitor could be added to control the reaction kinetics.

After the above materials are mixed, the water is then added and the silicone phase inverted to form silicone droplets in the water as described above. After inversion, the chain extension reaction continues within the silicone droplet until all the materials have reacted or the reaction has been inhibited.

The quantity of water and/or surfactant used in the initial phase inversion process may have an impact on the particle size of the final emulsion. For instance, if an emulsion is formed with the same quantity of water in two instances but in the first a large quantity of water is mixed before the phase inversion step and in the second a small quantity of water is mixed before the phase inversion step followed by mixing the remaining additional water after the phase inversion step, the first emulsion will generally have a larger particle size than the second.

No matter how the water is added (that is before and after inversion), the total amount of water used is generally between about 1 and 99 wt. %, preferably between about 6 and about 99 wt. %, based on the weight of the emulsion.

The polymerisation of the present invention takes place at the interior of the oil droplets by chain extension (that is not at the o/w interface) as shown by the fact that the silicone in the droplets generally have the same viscosity as if the silicone is mixed in bulk (that is non-emulsified). As such, the degree of polymerisation is not controlled by droplet size, but by the ratio of materials used in the chain extension. This, in turn, allows for the production of a broad range of monodisperse droplet sizes containing polysiloxanes with a high viscosity. Moreover, this technique allow for the production of emulsions with high silicone volume fractions.

Another of the advantages of the process of the invention is that it can be performed without heat and acidic or basic catalysts in a relatively short time using a wide range of surfactants.

The emulsions of the present invention can generally have a silicone loading in the range of about 1 to about 94 wt. %. The molecular weight of the silicone can be in the range of about 1 $mm^2$/sec at 25° C. to in excess of $10^8$ $mm^2$/sec at 25° C. The mean particle size of the emulsion can vary from about 0.3 to in excess of 100 micrometers. Particularly relevant is the fact that this process produces previously unknown emulsions in which the mean particle size is in the range of about 0.3 micrometers and the viscosity of the silicone is greater than $10^5$ $mm^2$/sec. Specifically, we have discovered emulsions in which the mean particle size is in the range of about 0.3, preferably 1, to 100 micrometers with viscosities of the silicone in the range of $10^6$ to $10^8$ $mm^2$/sec.

The emulsions of the invention also have a number of other practical advantages. For instance, the emulsions of the invention render the high molecular weight silicone in the droplets easily handleable. Similarly, since the silicone in the droplets of the invention generally have the same viscosity as if the silicone is mixed in bulk, one can determine the viscosity of the silicone before emulsion. Also, this allows one to easily perform quality checks on the silicone in the emulsions.

The emulsions of the invention are useful in the standard applications for silicone emulsions. Thus, they are useful for personal care applications such as on hair, skin, mucous, teeth, etc. In these applications, the silicone is lubricious and will improve the properties of skin creams, skin care lotions, moisturizers, facial treatments such as acne or wrinkle removers, personal and facial cleansers, bath oils, perfumes, fragrances, colognes, sachets, sunscreens, pre-shave and after shave lotions, shaving soaps and shaving lathers. It can likewise be use in hair shampoos, hair conditioners, hair sprays, mousses, permanents, depilatories, and cuticle coats to provide conditioning benefits. In cosmetics, it function as a levelling and spreading agent for pigment in make-ups, colour cosmetics, foundations, blushes, lipsticks, eye liners, mascaras, oil removers, colour cosmetic removers and powders. It is likewise useful as a delivery system for oil and water soluble substances such as vitamins, organic sunscreens, ceramides, pharmaceuticals. When compounded into sticks, gels, lotions aerosols and roll-ons, the emulsions of this invention impart a dry silky-smooth payout.

When used in personal care products, they are generally incorporated in amounts of about 0.01 to about 50 weight percent, preferably 0.1 to 25 wt. percent, of the personal care product. They are added to conventional ingredients for the personal care product chosen. Thus, they can be mixed with deposition polymers, surfactants, detergents, antibacterials, anti-dandruffs, foam boosters, proteins, moisturising agents, suspending agents, opacifiers, perfumes, colouring agents, plant extracts, polymers, and other conventional care ingredients.

Beyond personal care, the emulsion of the invention are useful for numerous other applications such as textile fibre treatment, leather lubrication, fabric softening, release agents, water based coatings, oil drag reduction, lubrication, facilitation of cutting cellulose materials, and in many other areas where silicones are conventionally used.

The following Examples are provided so that one skilled in the art will more readily understand the invention. Unless otherwise indicated, all parts and percents are by weight and all viscosities are at 25° C.

EXAMPLES 1–3

1) 29 parts of a dimethylvinylsiloxy terminated polydimethylsiloxane having a viscosity of about 7,000 to 12,000 mm$^2$/sec at 25° C.; 0.9 parts of a liquid organohydrogenpolysiloxane having the average formula Me$_2$HSiO (Me$_2$SiO)$_{20}$SiMe$_2$H wherein Me denotes the methyl radical and containing 0.16 to 0.20% SiH; and 0.015 parts platinum in a platinum catalyst material were mixed.

2) 29 parts of the same dimethylvinylsiloxy terminated polydimethylsiloxane as above; 1 part of the same organohydrogenpolysiloxane as above; and 0.015 parts platinum as above were mixed.

3) 29 parts of the same dimethylvinylsiloxy terminated polydimethylsiloxane as above; 1.15 parts of the same organohydrogenpolysiloxane as above; and 0.015 parts platinum as above were mixed.

To each of the above mixtures was added 0.75 parts Laureth-3 and 1 part Laureth-23. Finally, the following quantities of water were added to the mixtures in 5 stages with mixing after each addition: 1.5 parts, 2.5 parts, 5 parts, 6 parts and 4 parts.

The resultant emulsions had mean particle sizes of 0.45 micrometers in each case and the viscosity of the silicones in the droplets was as follows:

Ex 1=1.25 million mm$^2$/sec

Ex 2=5.2 million mm$^2$/sec

Ex 3=75 million mm$^2$/sec

EXAMPLE 4

Examples 1–3 were repeated except the water was added in 2 stages in the following amounts: 7 parts and 5 parts. The resultant materials had mean particle sizes of 8.5 microns in each case.

EXAMPLE 5

Examples 1–3 were repeated except that 12 parts water was added in 1 single stage. The resultant materials had mean particle sizes of 60 microns in each case.

EXAMPLE 6

This example demonstrates the use of different surfactants.

29 parts of a dimethylvinylsiloxy terminated polydimethylsiloxane having a viscosity of about 7,000 to 12,000 mm$^2$/sec at 25° C.; 1.05 parts of the same organohydrogenpolysiloxane as used in Example 1; and 0.015 parts platinum as in Example 1 were mixed.

To portions of this mixture was added the surfactant and water identified below:

A.

2 parts sodium laurylether 3 sulfate (anionic)

2 parts water

Viscosity—9×10$^6$ mm$^2$/sec

Mean particle size—5 micrometers

B.

4 parts acrylates/C10–30 alkyl acrylate crosspolymer 45.2 parts water before inversion 34.8 parts water after inversion Viscosity—14.4×10$^6$ mm$^2$/sec Mean particle size—13 micrometers

C.

3 parts decyl glucoside 2 parts water before inversion 34.8 parts water after inversion Viscosity—2.03×10$^7$ mm$^2$/sec Mean particle size—2.2 micrometers

D.

6 parts Hexadecylammonium chloride (cationic)

34.8 parts water

Viscosity—1.55×10$^7$ mm$^2$/sec

Mean particle size—5.15 micrometers

E.

2 parts disodium ricinoleamino monoethylamine sulfosuccinate (amphoteric)

6 parts water before inversion 34.8 parts water after inversion

Viscosity—1.34×10$^7$ mm$^2$/sec

Mean particle size—12.2 micrometers

What is claimed is:

1. A method of making a silicone in water emulsion comprising:

mixing materials comprising (I) a composition containing at least one polysiloxane, at least one organosilicon material that reacts with said polysiloxane by a chain extension reaction and a metal containing catalyst for said chain extension reaction, (II) at least one surfactant selected from the group consisting of anionic, cationic, alkylpolysaccharide and amphoteric, and (III) water to form a mixture; and emulsifying the mixture;

the composition (I) being selected from the group consisting of (i) a polysiloxane having at least one Si—OH group, an alkoxysilane having at least two alkoxy groups, and a metal containing catalyst, and (ii) a polysiloxane having at least one Si—OH group, a polysiloxane having at least one alkoxy group, and a metal containing catalyst.

2. A method according to claim 1 in which the surfactant is present in an amount of between about 1 and 30 weight percent based on the weight of composition (I).

3. A method according to claim 1 in which the water is present in an amount of between about 6 and 99 weight percent based on the weight of the emulsion.

4. A method according to claim 1 in which the mixture includes a material selected from the groups consisting of reaction inhibitors, perfumes, colorants, thickeners, preservatives, plasticizers, and active ingredients selected from the group consisting deposition polymers, surfactants, detergents, antibacterials, anti-dandruffs, foam boosters, proteins, moisturizing agents, suspending agents, opacifiers, perfumes, coloring agents and plant extracts.

5. A silicone in water emulsion made by a method according to claim 1.

* * * * *